(12) United States Patent
Suzuki

(10) Patent No.: US 7,133,260 B2
(45) Date of Patent: Nov. 7, 2006

(54) RECORDING MEDIUM DRIVE CAPABLE OF AVOIDING DAMAGES OF RECORDING MEDIUM

(75) Inventor: Hiroshi Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/205,741

(22) Filed: Aug. 17, 2005

(65) Prior Publication Data
US 2006/0007600 A1  Jan. 12, 2006

Related U.S. Application Data

(62) Division of application No. 10/199,712, filed on Jul. 19, 2002, now Pat. No. 6,956,723.

(30) Foreign Application Priority Data
Mar. 6, 2002  (JP) .............. 2002-059859

(51) Int. Cl.
*G11B 5/54* (2006.01)
(52) U.S. Cl. .................................... 360/255
(58) Field of Classification Search ............... 360/255, 360/255.2, 255.3, 255.6, 255.7, 255.8, 254.2, 360/254.3, 254.7, 254.8, 254.9, 250, 97.02, 360/97.03
See application file for complete search history.

(56) References Cited

U.S. PATENT DOCUMENTS

| | | | |
|---|---|---|---|
| 5,189,575 A * | 2/1993 | Onooka et al. ............. | 360/255 |
| 5,239,431 A | 8/1993 | Day et al. ................ | 360/98.08 |
| 5,640,290 A | 6/1997 | Khanna et al. ............. | 360/105 |
| 5,898,545 A * | 4/1999 | Schirle ..................... | 360/254.7 |
| 6,201,664 B1 | 3/2001 | Le et al. .................. | 360/244.9 |
| 6,226,154 B1 | 5/2001 | Albrecht .................. | 360/254.8 |
| 6,301,073 B1 | 10/2001 | Gillis et al. .............. | 360/97.01 |
| 6,369,978 B1 | 4/2002 | Shimizu et al. ............ | 360/97.3 |
| 6,373,666 B1 | 4/2002 | Iida et al. ................ | 360/254.7 |
| 6,437,945 B1 | 8/2002 | Hawwa et al. ........... | 360/254.8 |
| 6,473,270 B1 | 10/2002 | McDonald et al. ....... | 360/265.1 |
| 6,570,741 B1 | 5/2003 | Yamanouchi ............ | 360/254.4 |

FOREIGN PATENT DOCUMENTS

| | | |
|---|---|---|
| JP | 05266621 | 10/1993 |
| JP | 11-144411 | 5/1999 |
| JP | 11-345471 | 12/1999 |
| JP | 2000-156068 | 6/2000 |
| JP | 2001-222871 | 8/2001 |

* cited by examiner

*Primary Examiner*—Angel Castro
(74) *Attorney, Agent, or Firm*—Greer, Burns & Crain, Ltd.

(57) ABSTRACT

A protrusion is opposed to a head actuator positioned at the inoperative position in a recording medium drive such as a hard disk drive. When a larger impact is applied to the head actuator, the head actuator deforms by a predetermined amount, so that the protrusion receives the head actuator. The deformation of the head actuator is thus restricted. A collision can be avoided between the head actuator and the recording medium. The predetermined amount can be determined based on the space or distance between the head actuator and the recording medium. It is possibly easy to assemble and position the protrusion relative to the head actuator at a higher accuracy, as compared with the case where the overall planar surface must be positioned relative to the head actuator at a higher accuracy in the conventional manner. This leads to the production of the protrusion or displacement suppression member at a lower cost.

9 Claims, 5 Drawing Sheets

RECORDING MEDIUM DRIVE CAPABLE OF AVOIDING DAMAGES OF RECORDING MEDIUM

This is a divisional of application Ser. No. 10/199,712, filed Jul. 19, 2002 now U.S. Pat. No. 6,956,723.

BACKGROUND OF THE INVENTION

1. Field of the Invention

The present invention relates to a recording medium drive or data storage apparatus, such as a hard disk drive (HDD) utilizing a magnetic disk as a recording medium.

2. Description of the Prior Art

For example, a hard disk drive (HDD) allows a head actuator to get positioned at a predetermined inoperative position when a magnetic recording disk stands still. When the head actuator is positioned at the inoperative position, the actuator arm of the head actuator, at least partly, is allowed to get opposed to the surface of the magnetic recording disk. If an impact is applied to the hard disk drive from the outside in this condition, the actuator arm is caused to deform. The actuator arm may collide against the magnetic recording disk based on such deformation. The collision may lead to scratches over the surface of the magnetic recording disk. The scratches may generate contaminations scattered over the surface of the magnetic recording disk. The contaminations may disrupt read/write operations of magnetic information.

A displacement suppression member is proposed to suppress the deformation of the actuator arm as disclosed in Japanese Patent Application Publication Nos. 11-144411 and 11-345471. The displacement suppression member is designed to face the actuator arm with a planar surface. The planar surface of the displacement suppression member is allowed to receive the actuator arm, so that the deformation of the actuator can be suppressed to the utmost. In this manner, any collision is avoided between the actuator arm and the magnetic recording disk.

A predetermined amount of space should be set between the displacement suppression member and the actuator arm. If the space is smaller or narrower, the displacement suppression member tends to collide against the actuator arm even when the actuator arm normally swings to position a read/write head. It is not preferable. On the other hand, if the space is larger or wider, the deformation of the actuator arm cannot be suppressed enough to avoid a collision between the actuator arm and the magnetic recording disk. It is difficult to assemble the displacement suppression member into the hard disk drive, establishing a predetermined amount of space between the actuator arm and the overall planar surface of the displacement suppression member. In particular, in the case where a pair of actuator arms are set for the front and back surfaces of a single magnetic recording disk, the displacement suppression member should be located between the actuator arms. A still higher accuracy is required to position or assemble the displacement suppression member within the hard disk drive.

SUMMARY OF THE INVENTION

It is accordingly an object of the present invention to provide a displacement suppression member capable of easily establishing a predetermined amount of space between the displacement suppression member itself and a head actuator, a recording medium, or the like.

According to a first aspect of the present invention, there is provided a recording medium drive comprising: a recording medium; a head actuator having a medium-opposed surface facing the recording medium at a distance and designed to swing about a support shaft from an inoperative position; and a protrusion opposed to the medium-opposed surface of the head actuator when the head actuator is positioned at the inoperative position.

When a larger impact is applied to the head actuator positioned at the inoperative position, the head actuator deforms in a certain direction. For example, the tip end of the head actuator displaces and approaches the recording medium. When the head actuator deforms by a predetermined amount, the protrusion receives the head actuator. The deformation of the head actuator is thus restricted. A collision can be avoided between the head actuator and the recording medium. The predetermined amount can be determined based on the space or distance between the head actuator and the recording medium.

A predetermined amount of space or distance must accurately be set between the protrusion and the head actuator in the recording medium drive. If the space is smaller or narrower, the protrusion tends to collide against the head actuator even when the head actuator normally swings. It is not preferable. On the other hand, if the space is larger or wider, the deformation of the head actuator cannot be suppressed enough to avoid a collision between the head actuator and the recording medium. The amount of space can be set between the protrusion and the head actuator in the aforementioned recording medium drive. As compared with the case where the overall planar surface must be positioned relative to the head actuator at a higher accuracy in the conventional manner, it is possibly easy to assemble and position the protrusion relative to the head actuator at a higher accuracy. The accuracy can be relieved during the production. The yield factor is expected to get improved. The protrusion or displacement suppression member can be obtained at a lower cost. The protrusion may preferably be shaped into a dome.

In particular, the head actuator at the inoperative position may be designed to position the tip end of the head actuator at a position outside the outer periphery of the recording medium. For example, the tip end of the head actuator at the inoperative position is received on a ramp member in a hard disk drive as one type of the recording medium drive. When the head actuator deforms in the aforementioned manner, the tip end of the head actuator is pulled back toward the support shaft. If the deformation of the head actuator can be suppressed in the aforementioned manner, the displacement of the tip end of the head actuator can be suppressed. Accordingly, the tip end of the head actuator can reliably be held on the ramp member. In the case where a load bar is attached to the tip end of the head actuator for contacting the ramp member, for example, the length of the load bar can be reduced to the utmost. If the deformation is not suppressed enough in the head actuator, the tip end of the head actuator sometimes drops from the ramp member.

The protrusion may be located closer to the recording medium than a plane including a central axis of the support shaft and a center of gravity of the head actuator positioned at the inoperative position. For example, assume that a still larger impact acts on the head actuator. In this case, the deformation or elasticity of the protrusion as well as of the head actuator may not completely absorb the impact. A torsional deformation is induced in the head actuator. The center of gravity of the head actuator keeps displacing even after the collision of the protrusion against the head actuator.

If the protrusion is located closer to the recording medium than the center of gravity, the head actuator is forced to twist in the direction to get distanced from the recording medium. Accordingly, the head actuator is reliably prevented from colliding against the recording medium. A larger impact can be absorbed enough in this manner.

The recording medium drive may further include a plate member designed to support the protrusion. A shroud surface may be defined at the end surface of the plate member. The shroud surface is designed to get opposed to the outer peripheral surface of the recording medium. A predetermined amount of space or distance may be set between the shroud surface and the recording medium. The shroud surface serves to rectify airflow generated along the outer peripheral surface of the moving or rotating recording medium. It is possible to reduce or avoid vibration or displacement of the recording medium by the rectification of the airflow.

According to a second aspect of the present invention, there is provided a recording medium drive comprising: a recording medium; a head actuator having a medium-opposed surface facing the recording medium at a distance and unloaded to a predetermined inoperative position outside the outer periphery of the recording medium; and a displacement suppression member opposed to the medium-opposed surface of the head actuator when the head actuator is positioned at the inoperative position.

In this aspect, since the head actuator is allowed to completely stay outside the outer periphery of the recording medium at the inoperative position, a collision can reliably be avoided between the head actuator and the recording medium even if the head actuator deforms by a larger amount. Moreover, the aforementioned protrusion is expected to reduce the deformation of the head actuator enough. The displacement of the tip end of the head actuator can be suppressed. For example, in the case where a load bar is attached to the tip end of the head actuator for contacting the ramp member, the load bar can reliably be held on the ramp member. The length of the load bar can be reduced. If the deformation is not suppressed enough in the head actuator, the tip end of the head actuator sometimes drops from the ramp member.

According to a third aspect of the present invention, there is provided a recording medium drive comprising: a recording medium; and a protrusion positioned at a position spaced from a surface of the recording medium.

If the recording medium displaces in response to application of a larger impact, the recording medium can be received on the protrusion. The displacement of the recording medium can be suppressed to a predetermined amount. A collision can reliably be avoided between the head actuator and the recording medium. The predetermined amount can be determined based on the space or distance between the recording medium and the protrusion.

A predetermined amount of space or distance must accurately be set between the protrusion and the recording medium in the recording medium drive. If the space is smaller or narrower, the protrusion tends to contact the moving or rotating recording medium. It is not preferable. On the other hand, if the space is larger or wider, the deformation of the recording medium cannot be suppressed enough to avoid a collision between the recording medium and any components adjacent the recording medium. The amount of space can be set between the protrusion and the recording medium in the aforementioned recording medium drive. As compared with the case where the overall planar surface must be positioned relative to the recording medium at a higher accuracy in the conventional manner, it is possibly easy to assemble and position the protrusion relative to the recording medium at a higher accuracy. The accuracy can be relieved during the production. The yield factor is expected to get improved. The protrusion or displacement suppression member can be obtained at a lower cost. The protrusion may preferably be shaped into a dome.

The protrusion is preferably designed to receive the recording medium at a position outside a data zone of the recording medium when the recording medium displaces. Any damages such as scratches, caused by the collision between the protrusion and the recording medium, can reliably be prevented in the data zone.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
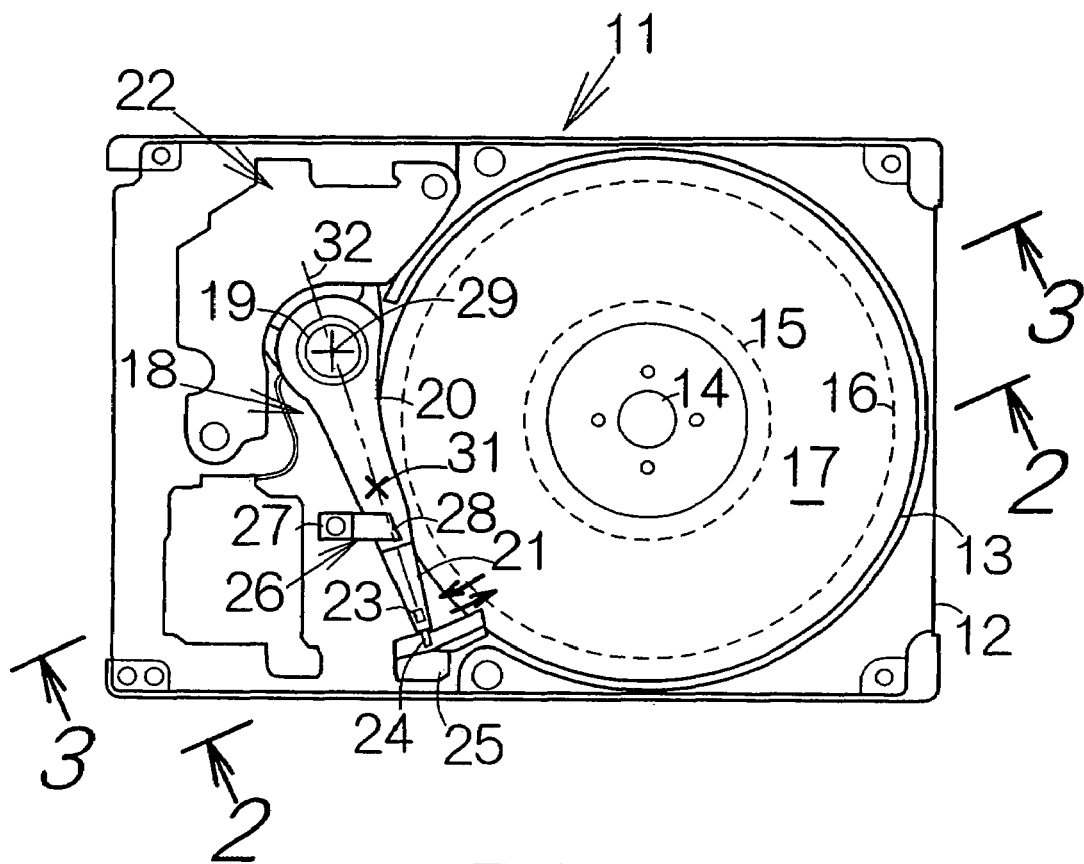
FIG. 1 is a plan view schematically illustrating the structure of a hard disk drive (HDD) according to a first embodiment of the present invention.

FIG. 1 schematically illustrates the inner structure of a hard disk drive (HDD) 11 as an example of a recording medium drive or storage device according to a first embodiment of the present invention. The HDD 11 includes a box-shaped primary enclosure 12 defining an inner space of a flat parallelepiped, for example. Magnetic recording disks 13 are mounted on a driving shaft of a spindle motor 14 within the primary enclosure 12. The spindle motor 14 is allowed to drive the magnetic recording disks 13 for rotation at a higher revolution speed such as 7,200 rpm or 10,000 rpm, for example. A cover, not shown, is coupled to the primary enclosure 12 so as to define the closed inner space between the primary enclosure 12 and the cover itself.

A data zone 17 is defined over the front and back surfaces of the magnetic recording disk 13 between an innermost recording track 15 and an outermost recording track 16. Concentric recording circles or tracks are defined within the data zone 17. No magnetic information is recorded on marginal zones inside the innermost recording track 15 and outside the outermost recording track 16.

A head actuator 18 is also accommodated in the inner space of the primary enclosure 12. The head actuator 18 is coupled to a vertical support shaft 19 for relative rotation. The head actuator 18 comprises actuator arms 20 extending in the horizontal direction from the vertical support shaft 19, and elastic suspensions 21 respectively attached to the tip ends of the actuator arms 20 so as to extend in the forward direction from the actuator arms 20. The actuator arms 20 have a predetermined rigidity. The actuator arms 20 may be punched out of a stainless steel plate, for example. Alternatively, the actuator arms 20 may be formed by extrusion of an aluminum material. The actuator arms 20 are related to individual front and back surfaces of the magnetic recording disks 13.

As is apparent from FIG. 1, the actuator arm 20 is positioned at a predetermined inoperative or unload position when the magnetic recording disk 13 stands still. The actuator arm 20 at the inoperative position brings the tip end of the elastic suspension 21 outside the outer periphery of the magnetic recording disk 13. The actuator arm 20 is allowed to swing about the support shaft 19 from the inoperative position. When the actuator arm 20 swings about the support shaft 19, the tip end of the elastic suspension 21 moves in the radial direction of the magnetic recording disk 13 across the data zone 17 between the outermost recording track 16 and the innermost recording track 15. The actuator arm 20 is opposed to the magnetic recording disk 13 at the medium-opposed surface of the arm 20 during the movement across the data zone 17. Any driving power source 22 such as a voice coil motor (VCM) may be utilized to realize the swinging movement of the actuator arm 20.

A flying head slider 23 is cantilevered at the front or tip end of the elastic suspension 21 with the assistance of a gimbal spring, not shown. The elastic suspension 21 serves to urge the flying head slider 23 toward the surface of the magnetic recording disk 13. When the magnetic recording disk 13 rotates, the flying head slider 23 is allowed to receive airflow generated along the rotating magnetic recording disk 13. The airflow serves to generate a lift on the flying head slider 23. The flying head slider 23 is thus allowed to keep flying above the surface of the magnetic recording disk 13 during rotation of the magnetic recording disk 13 at a higher stability established by the balance between the lift and the urging force of the elastic suspension 21. When the actuator arm 20 is driven to swing in the aforementioned manner during flight of the flying head slider 23, the flying head slider 23 can be positioned right above a target recording track on the magnetic recording disk 13. When the actuator arm 20 is positioned at the inoperative position, the flying head slider 23 reaches a position outside the magnetic recording disk 13 beyond the outermost recording track 16.

A magnetic head or electromagnetic transducer, not shown, is mounted on the flying head slider 23. The electromagnetic transducer may include a read element such as a giant magnetoresistive (GMR) element or a tunnel-junction magnetoresistive (TMR) element capable of reading magnetic information from the magnetic recording disk 13 based on the variation appearing in the electric resistance, and a write element such as a thin film head capable of writing magnetic information into the magnetic recording disk 13 based on the magnetic field induced at a thin film coil pattern, for example.

A load bar 24 is attached to the front or tip end of the elastic suspension 21 so as to further extend in the forward direction from the elastic suspension 21. The load bar 24 is allowed to move in the radial direction of the magnetic recording disk 13 based on the swinging movement of the actuator arm 20. A ramp member 25 is located outside the magnetic recording disk 13 on a path of the movement of the load bar 24. When the actuator arm 20 is positioned at the inoperative position, the load bar 24 is received on the ramp member 25. The combination of the load bar 24 and the ramp member 25 establishes a so-called load/unload mechanism as described later. The ramp member 25 may be formed from a hard plastic material, for example.

A displacement suppression member 26 is located adjacent the actuator arm 20 outside the magnetic recording disk 13. The displacement suppression member 26 includes a base 27 fixed on the primary enclosure 12, and plate members 28 extending in the horizontal direction from the base 27 toward the outer peripheral ends of the magnetic recording disks 13. The individual plate members 28 are designed to cross a vertical plane 32 including the central axis 29 of the support shaft 19 and the center 31 of gravity of the actuator arm 20. The displacement suppression member 26 will be described later in detail. The displacement suppression member 26 may be formed from a hard plastic material, for example.

Figure 2:
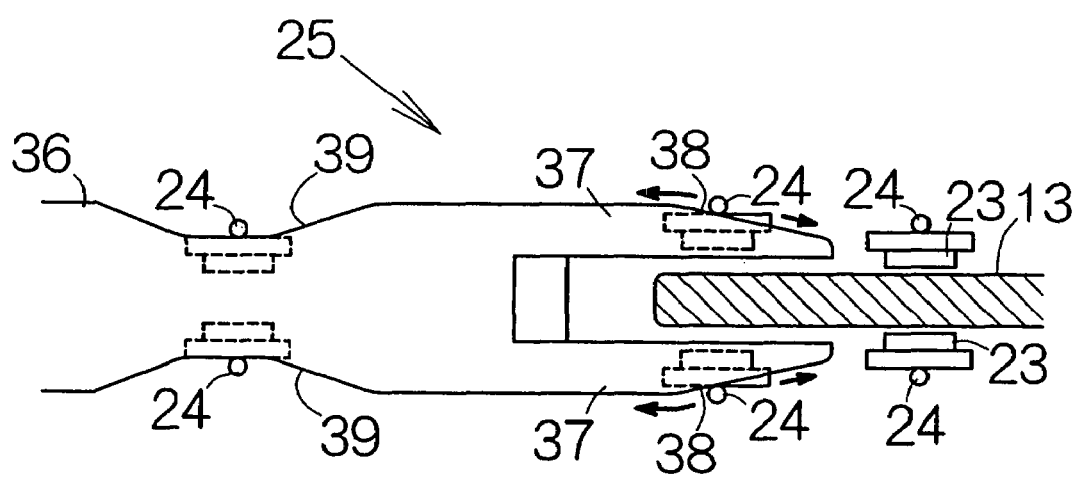
FIG. 2 is an enlarged partial sectional view of the HDD, taken along the line 2—2 in FIG. 1, for schematically illustrating the structure and function of a ramp member.

As shown in FIG. 2, the ramp member 25 includes an attachment base, not shown, screwed on the bottom plate of the primary enclosure 12, and arm members 36 extending from the attachment base in the horizontal direction toward the rotation axis of the magnetic recording disks 13. A pair of ramps 37 are integrally formed on the arm member 36. The ramps 37 are designed to face the marginal zones outside the outermost recording tracks on the front and back surfaces of the magnetic recording disk 13. A slope 38 is defined on the individual ramp 37. The slope 38 is designed to get remote from the surface of the magnetic recording disk 13 at the radially outer location of the magnetic recording disk 13.

Now, assume that the rotation of the magnetic recording disk 13 is terminated. When read/write operations have been completed, the driving power source 22 drives the actuator arm 20 in a normal direction toward the inoperative position. When the flying head slider 23 gets opposed to the marginal or landing zone outside the outermost recording track 16, the load bar 24 is allowed to contact the slope 38 of the ramp 37. Further swinging movement of the actuator arm 20 allows the load bar 24 to climb up the slope 38. As the load bar 24 gets higher along the slope 38, the flying head slider 23 gets remote from the surface of the magnetic recording disk 13. The load bar 24 is received on the ramp member 25 in this manner. When the actuator arm 20 has reached the inoperative position, the load bar 24 is received in a depression 39. The magnetic recording disk 13 stops rotating. Since the load bar 24 is reliably supported on the ramp member 25, the flying head slider 23 is prevented from colliding or contacting against the magnetic recording disk 13 even without any airflow acting on the flying head slider 23.

When the HDD 11 receives instructions to read or write magnetic information, the magnetic recording disk 13 starts to rotate. The driving power source 22 drives the actuator arm 20 in the reserve direction opposite to the aforementioned normal direction after the rotation of the magnetic recording disk 13 enters the steady condition. The load bar 24 is allowed to move out of the depression 39 toward the slope 38. A further swinging movement of the actuator arm 20 causes the load bar 24 to move down the slope 38.

During the downward movement of the load bar 24, the flying head slider 23 gets opposed to the surface of the magnetic recording disk 13. Airflow generated along the surface of the magnetic recording disk 13 induces a lift on the flying head slider 23. A further swinging movement of the actuator arm 20 allows the load bar 24 to take off from the slope 38 or ramp member 25. Since the magnetic recording disk 13 rotates in the steady condition, the flying head slider 23 can fly above the surface of the magnetic recording disk 13 without a support from the ramp member 25.

Here, a detailed description will be made on the structure of the displacement suppression member 26 referring to FIG. 3. Planar surfaces 41 are defined on the plate member 28. The planar surfaces 41 are designed to respectively face the medium-opposed surfaces of the actuator arms 20 positioned at the inoperative position. The planar surfaces 41 may extend in parallel with paths of the movement of the corresponding actuator arms 20. Otherwise, a planar surface 42 is defined on the displacement suppression member 26 so as to face the back or upper side of the uppermost actuator arm 20. In addition, a planar surface 43 is likewise defined on the displacement suppression member 26 so as to face the back or lower side of the lowest actuator arm 20.

Protrusions 44 are integrally formed on the planar surfaces 41, 42, 43. The protrusions 44 are designed to protrude toward the corresponding actuator arms 20. A predetermined space d is set between the tips of the protrusions 44 and the corresponding medium-opposed surfaces of the actuator arms 20. The tips of the protrusions 44 are located closer to the medium-opposed surfaces of the actuator arms 20 than planes including the front and back surfaces of the magnetic recording disks 13. In addition, the protrusions 44 are located offset from the vertical plane 32, including the central axis 29 of the support shaft 19 and the centers 31 of gravity of the actuator arms 20, toward the magnetic recording disks 13.

Figure 4:
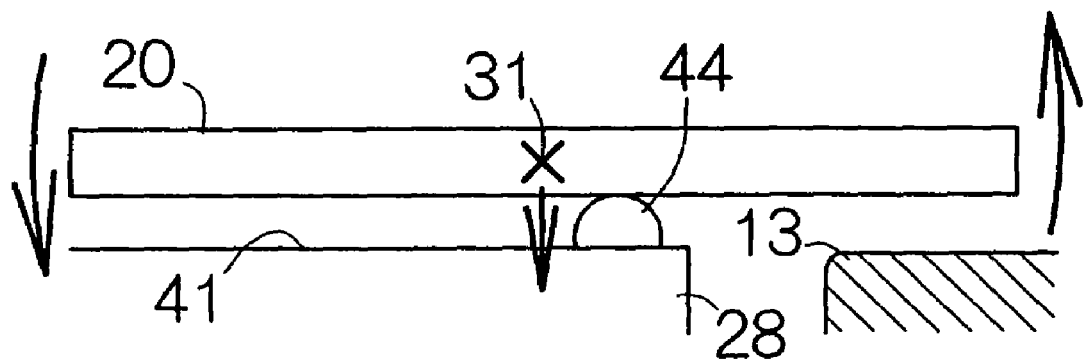
FIG. 4 is an enlarged partial view of FIG. 3 for schematically illustrating the function of the displacement suppression member.

Now, assume that a large impact is applied to the actuator arms 20 at the inoperative positions when the magnetic recording disks 13 stand still. The actuator arms 20 deform in a certain direction. For example, the tip ends of the actuator arms 20 displace and approach the magnetic recording disks 13. As shown in FIG. 4, when the actuator arm 20 deforms by a predetermined amount d(=the amount of space), the protrusion 44 receives the actuator arm 20. The deformation of the actuator arm 20 is thus restricted. A collision can be avoided between the actuator arms 20 and the magnetic recording disks 13 in this manner.

If the deformation or elasticity of the protrusions 44 as well as of the actuator arms 20 cannot completely absorb a larger impact, a torsional deformation is induced in the actuator arms 20, as is apparent from FIG. 4. The center 31 of gravity of the actuator arm 20 keeps displacing even after the collision of the protrusion 44 against the actuator arm 20. In this case, since the protrusions 44 are located closer to the magnetic recording disk 13 than the center 31 of gravity, the actuator arm 20 is forced to twist in the direction toward the planar surface 41 of the displacement suppression member 26. The inner side of the actuator arm 20, closer to the spindle motor 14, is forced to get distanced from the surface of the magnetic recording disk 13. Accordingly, the actuator arm 20 is reliably prevented from colliding against the magnetic recording disk 13. A larger impact can be absorbed enough in this manner.

Figure 5:
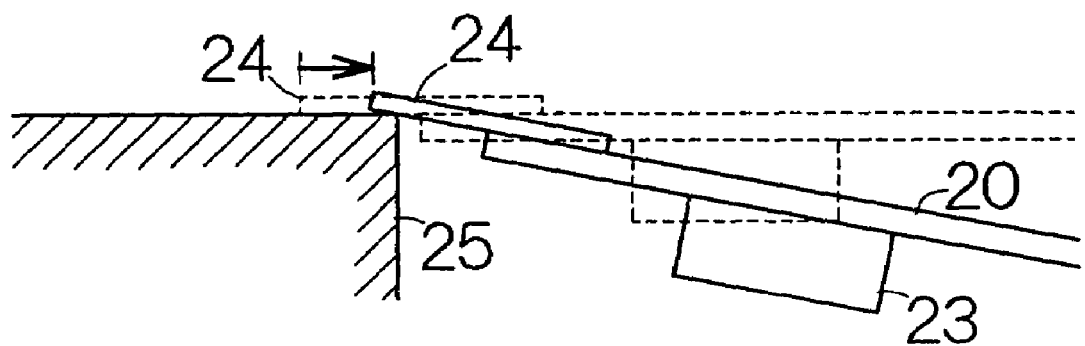
FIG. 5 is a side view illustrating the displacement suppression member and an actuator arm.

When the actuator arm 20 deforms, as shown in FIG. 5, the load bar 24 is pulled back toward the support shaft 19. However, the displacement of the load bar 24 can be suppressed in response to the suppression of the deformation in the actuator arm 20 in the aforementioned manner. Accordingly, the load bar 24 is reliably prevented from dropping from the ramp member 25. The length of the load bar 24 can be suppressed to the utmost. If the deformation is not suppressed enough in the actuator arm 20, the load bar 24 sometimes drops from the ramp member 25.

A predetermined amount d of space or distance must be set between the displacement suppression member 26 and the actuator arm 20 in the aforementioned HDD 11. If the space is smaller or narrower, the displacement suppression member 26 tends to collide against the actuator arm 20 even when the actuator arm 20 normally swings to position the electromagnetic transducer. It is not preferable. On the other hand, if the space is larger or wider, the deformation of the actuator arm 20 cannot be suppressed enough to avoid a collision between the actuator arm 20 and the magnetic recording disk 13. The amount d of space can be set between the protrusions 44 of the displacement suppression member 26 and the corresponding medium-opposed surfaces of the actuator arms 20 according to the first embodiment of the present invention. As compared with the case where the planar surfaces 41 must be positioned relative to the actuator arms 20 at a higher accuracy, it is possible to assemble and position the protrusions 44 relative to the actuator arms 20 at a higher accuracy in a facilitated manner. The accuracy can be relieved during the production. The yield factor is expected to get improved. The displacement suppression member 26 can be obtained at a lower cost.

Figure 3:
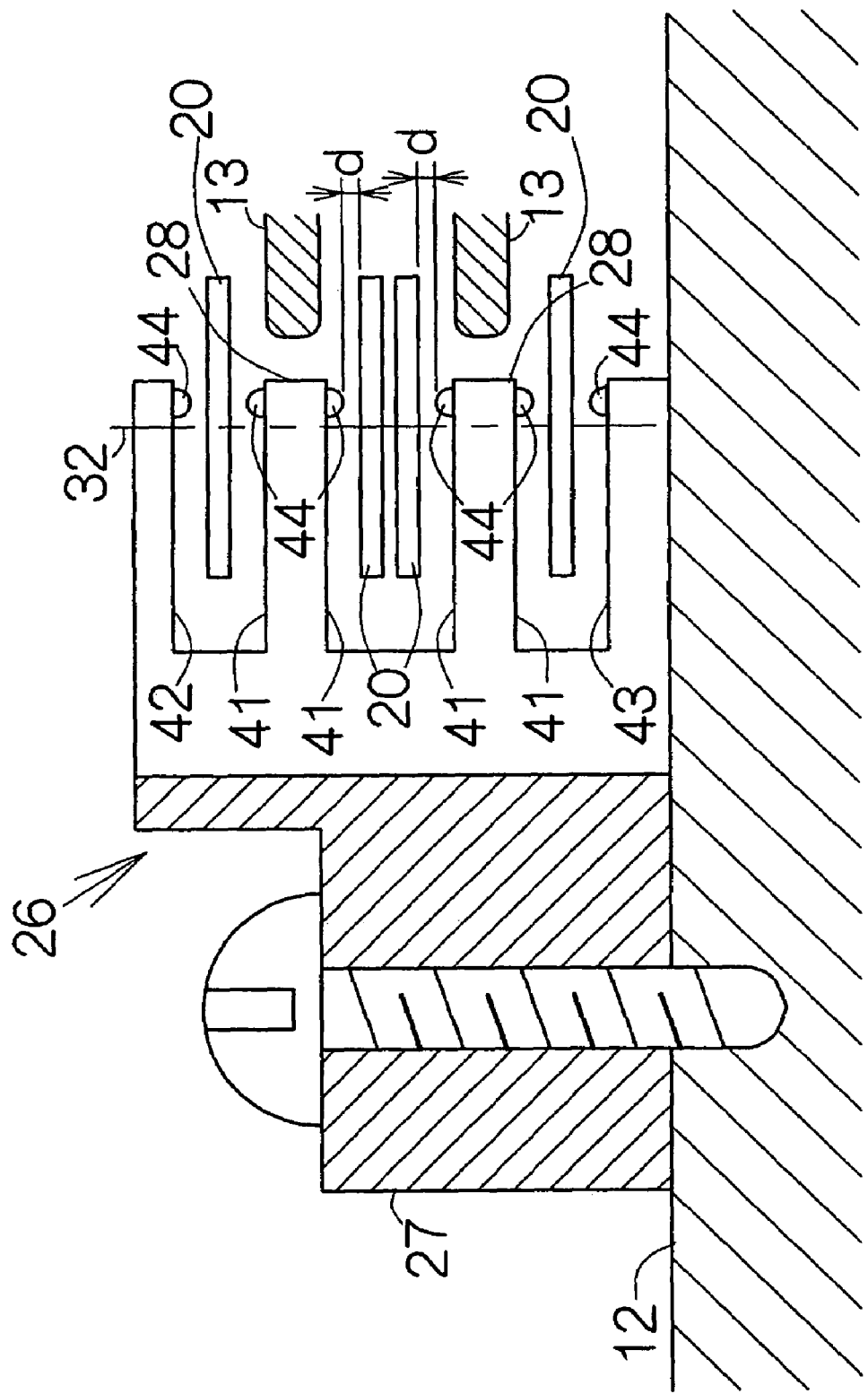
FIG. 3 is an enlarged partial sectional view of the HDD, taken along the line 3—3 in FIG. 1, for schematically illustrating the structure of a displacement suppression member.

In particular, in the case where the plate member 28 is disposed between the adjacent actuator arms 20, as shown in FIG. 3, a predetermined amount d of space must be set between the actuator arm 20 and the protrusions 44 on not only the front surface but also the opposite or back surface of the plate member 28. In such a situation, the displacement suppression member 26 serves to relieve the accuracy in assembling and positioning as compared with the case where a predetermined amount d of space should be established between the actuator arm 20 and the entire planar surfaces 41 on the opposite sides of the plate member 28.

Figure 6:
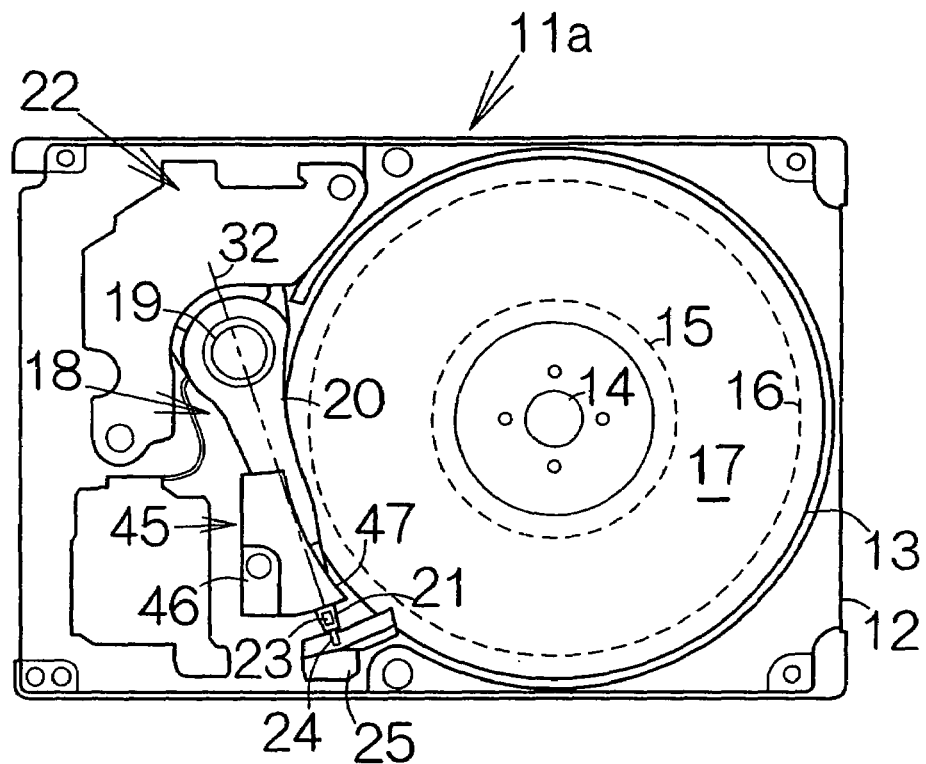
FIG. 6 is a plan view schematically illustrating the structure of a hard disk drive (HDD) according to a second embodiment of the present invention.

FIG. 6 schematically illustrates the inner structure of a hard disk drive (HDD) 11a according to a second embodiment of the present invention. In this embodiment, a displacement suppression member 45 is located outside the outer periphery of the magnetic recording disks 13 in the aforementioned manner. The displacement suppression member 45 includes a base 46 fixed to the primary enclosure 12, and plate members 47 extending in the horizontal direction from the base 47 toward the outer peripheral ends of the magnetic recording disks 13, in the same manner as the aforementioned displacement suppression member 26. The displacement suppression member 45 may be formed from a hard plastic material, for example. Like reference numerals are attached to components or structures equivalent to those of the aforementioned first embodiment.

Figure 7:
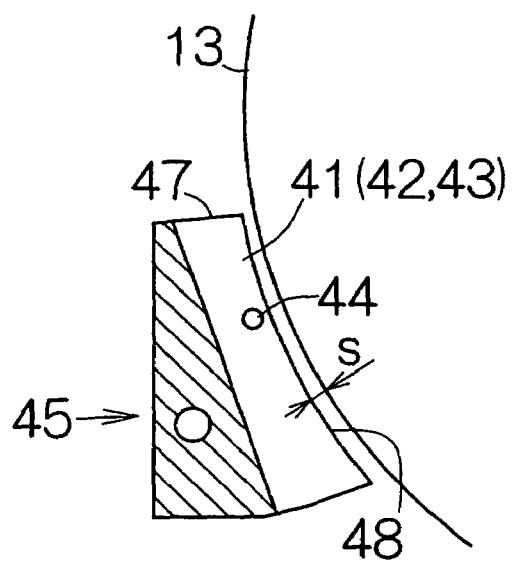
FIG. 7 is an enlarged plan view, with a partial cutout, of a displacement suppression member within the HDD according to the second embodiment.

As is apparent from FIG. 7, a shroud surface 48 is defined on the individual plate member 47 at the end surface thereof. The shroud surface 48 is designed to face the corresponding outer peripheral surface of the magnetic recording disk 13 at a distance. A predetermined amount s of space or distance is set between the shroud surface 48 and the magnetic recording disk 13. The shroud surface 48 serves to rectify airflow generated along the outer peripheral surface of the rotating magnetic recording disk 13. It is possible to reduce or avoid vibration or displacement of the magnetic recording disk 13 by the rectification of the airflow. The flying head slider 23 is allowed to keep flying above the surface of the magnetic recording disk 13 by a stable flying amount or height. In addition, the planar surfaces 41, 42, 43 as well as the protrusions 44 are formed on the plate members 47 in the same manner as the aforementioned displacement suppression member 26.

Figure 8:
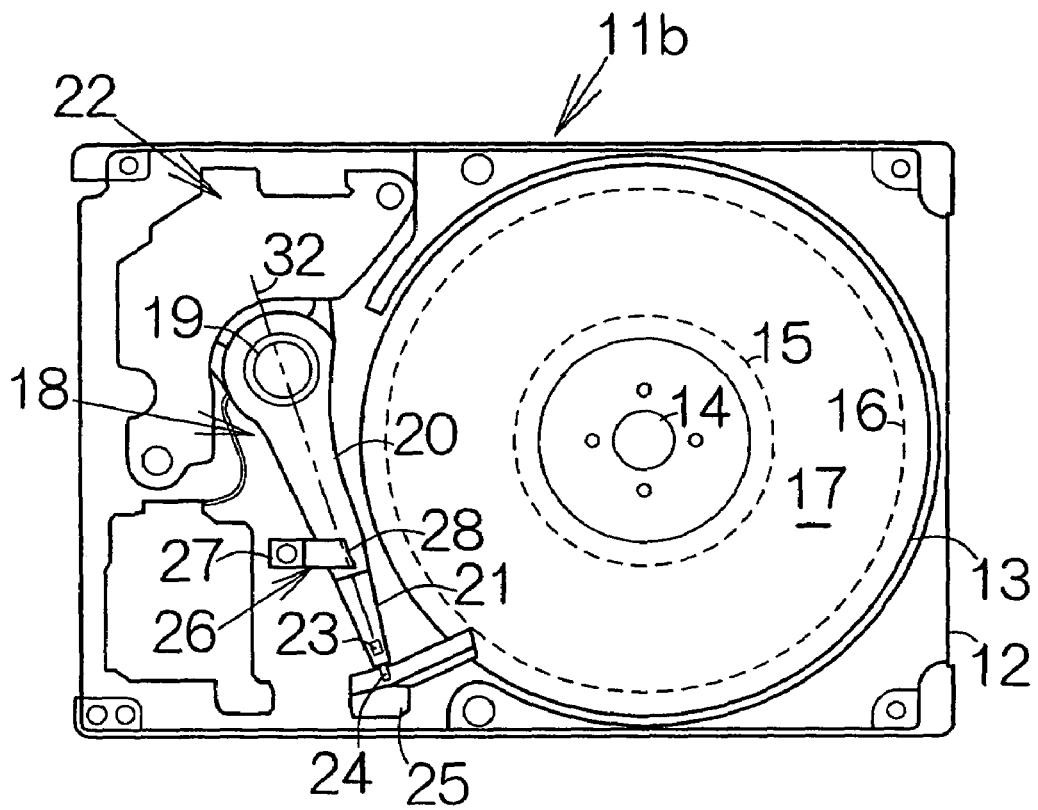
FIG. 8 is a plan view schematically illustrating the structure of a hard disk drive (HDD) according to a third embodiment of the present invention.

FIG. 8 schematically illustrates the inner structure of a hard disk drive (HDD) 11b according to a third embodiment of the present invention. In this embodiment, the actuator arms 20 are allowed to completely stay outside the outer periphery of the magnetic recording disks 13 at the inoperative position when the magnetic recording disks 13 stand still. The actuator arm 20 of this type serves to reliably avoid a collision between the actuator arm 20 and the magnetic recording disk 13 even if the actuator arm 20 deforms by a larger amount. Moreover, the aforementioned displacement suppression member 26 is expected to avoid drop or removal of the load bar 24 from the ramp member 25. The load bar 24 can stably be held on the ramp member 25 when the actuator arm 20 takes the inoperative position. Like reference numerals are attached to components or structures equivalent to those of the aforementioned first embodiment.

Figure 9:
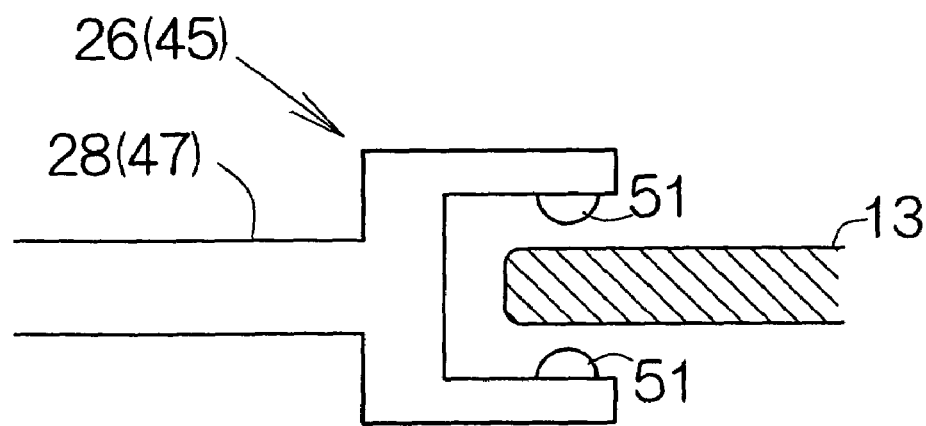
FIG. 9 is an enlarged sectional view of the displacement suppression member according to a modified embodiment.

For example, additional protrusions 51 may be formed on the displacement suppression member 26, 45, as shown in FIG. 9. The protrusions 51 are designed to face the front and back surfaces of the magnetic recording disks 13 at a distance. In particular, the protrusions 51 are preferably opposed to positions outside the data zone 17 and/or the landing zone. If the magnetic recording disk 13 displaces in response to application of a larger impact, the magnetic recording disk 13 can be received on the protrusions 51 over an area outside the data zone 17 as well as the landing zone. The displacement of the magnetic recording disk 13 can be suppressed to a predetermined amount. A collision can reliably be avoided between the actuator arms 20 and the magnetic recording disks 13 in this manner. The protrusions 51 may be shaped into a dome.

The displacement suppression member 26, 45 may be assembled within any types of a recording medium drive or storage apparatus, including a magnetic recording medium drive or storage apparatus utilizing a magnetic disk or the like.

What is claimed is:

1. A recording medium drive comprising:
    a recording medium;
    a head actuator having a medium-opposed surface facing the recording medium at a distance and designed to swing about a support shaft from an inoperative position;
    a protrusion opposed to the medium-opposed surface of the head actuator when the head actuator is positioned at the inoperative position; and
    a plate member designed to support the protrusion and defining a shroud surface at an end surface of the plate member, the shroud surface opposed to an outer peripheral surface of the recording medium, wherein
    a gap exists between the protrusion and the medium-opposed surface of the head actuator.

2. The recording medium drive according to claim 1, wherein the head actuator at the inoperative position is designed to position a tip end of the head actuator at a position outside an outer periphery of the recording medium.

3. The recording medium drive according to claim 2, wherein the protrusion is shaped into a dome.

4. The recording medium drive according to claim 3, wherein said drive is a hard disk drive including a magnetic disk as the recording medium.

5. The recording medium drive according to claim 1, wherein the protrusion is shaped into a dome.

6. The recording medium drive according to claim 1, wherein said drive is a hard disk drive including a magnetic disk as the recording medium.

7. A recording medium drive comprising:
    a recording medium;
    a head actuator having a medium-opposed surface facing the recording medium at a distance and designed to swing about a support shaft from an inoperative position;
    a protrusion opposed to the medium-opposed surface of the head actuator when the head actuator is positioned at the inoperative position, said protrusion being located closer to the recording medium than a plane including a central axis of the support shaft and a center of gravity of the head actuator positioned at the inoperative position; and
    a plate member designed to support the protrusition and defining a shroud surface at an end surface of the plate member, the shroud surface opposed to and outer peripheral surface of the recording medium.

8. The recording medium drive according to claim 7, wherein the protrusion is shaped into a dome.

9. The recording medium drive according to claim 8, wherein said drive is a hard disk drive including a magnetic disk as the recording medium.

* * * * *